US012725947B2

(12) United States Patent
Briant

(10) Patent No.: US 12,725,947 B2
(45) Date of Patent: Sep. 1, 2026

(54) CARD EDGE CONNECTOR

(71) Applicant: TE Connectivity Solutions GmbH, Schaffhausen (CH)

(72) Inventor: Eric David Briant, Dillsburg, PA (US)

(73) Assignee: TE CONNECTIVITY SOLUTIONS GmbH, Schaffhausen (CH)

( * ) Notice: Subject to any disclaimer, the term of this patent is extended or adjusted under 35 U.S.C. 154(b) by 425 days.

(21) Appl. No.: 18/540,485

(22) Filed: Dec. 14, 2023

(65) Prior Publication Data

US 2025/0202142 A1 Jun. 19, 2025

(51) Int. Cl.
*H01R 12/70* (2011.01)
*H01R 12/71* (2011.01)
*H01R 12/72* (2011.01)

(52) U.S. Cl.
CPC ....... *H01R 12/7017* (2013.01); *H01R 12/714* (2013.01); *H01R 12/721* (2013.01); *H01R 12/724* (2013.01)

(58) Field of Classification Search
CPC .............. H01R 12/7017; H01R 12/721; H01R 12/714; H01R 12/724; H01R 13/405; H01R 13/508; H01R 12/57; H01R 12/73; H01R 12/723; H01R 12/722; H01R 12/7005; H01R 13/24; H01R 13/42; H01R 24/00; H01R 43/20
USPC .................................................. 439/377, 637
See application file for complete search history.

(56) References Cited

U.S. PATENT DOCUMENTS

| | | | | |
|---|---|---|---|---|
| 10,027,046 B1 * | 7/2018 | Phillips | ................ | H01R 12/721 |
| 10,374,341 B1 * | 8/2019 | Phillips | .................. | H01R 12/73 |
| 10,553,971 B1 * | 2/2020 | Phillips | ................ | H01R 12/716 |
| 2015/0140866 A1 * | 5/2015 | Tsai | ..................... | H01R 12/724 439/637 |
| 2015/0171545 A1 * | 6/2015 | Yu | .......................... | H01R 13/11 439/485 |

* cited by examiner

*Primary Examiner* — Tulsidas C Patel
*Assistant Examiner* — Carlos E Lopez-Pagan

(57) ABSTRACT

A contact assembly includes an organizer having an organizer slot configured to receive a card edge of a circuit card. The contact assembly includes upper and lower contact arrays coupled to the central wall. The upper contact array includes upper contacts held by an upper contact holder. The lower contact array includes lower contacts held by a lower contact holder. The upper contact holder includes an upper locking tab and the lower contact holder includes a lower locking tab. The contact assembly includes a locking device coupled to the upper locking tab and the lower locking tab to secure the upper contact holder to the lower contact holder.

20 Claims, 9 Drawing Sheets

CARD EDGE CONNECTOR

BACKGROUND OF THE INVENTION

The subject matter herein relates generally to card edge connectors of communication systems.

Some communication systems utilize communication connectors, such as card edge connectors to interconnect various components of the system for data communication. Some known communication systems use pluggable module, such as I/O modules or circuit cards, which are electrically connected to the card edge connectors. The pluggable module has module circuit boards having card edges that are mated with the card edge connectors during the mating operation. Each card edge connector typically has an upper row of contacts and a lower row of contacts for mating with the corresponding circuit board. There is a need for connectors and circuit boards of communication systems to have greater contact density and/or data throughput. Known card edge connectors are not without disadvantages. For instance, large sections of the contacts are typically rigidly fixed within the connector housing, such as using a contact overmold to hold the contacts relative to each other and relative to the housing. The overmold is typically fixed to the housing at opposite ends thereof. However, the middle portions of the overmolds may move or pivot within the housing, such as during mating with the circuit card, leading to airgaps that negatively impact the signal integrity of the signal transmission lines leading to signal degradation.

A need remains for a reliable card edge connector to carry high speed signals.

BRIEF DESCRIPTION OF THE INVENTION

In one embodiment, a contact assembly is provided and includes an organizer that has a central wall that extends between a first side and a second side of the organizer. The organizer includes an upper platform and a lower platform at a front of the organizer. The organizer includes an organizer slot between the upper platform and the lower platform configured to receive a card edge of a circuit card. The contact assembly includes an upper contact array coupled to the central wall. The upper contact array includes upper contacts held by an upper contact holder. The upper contacts extend along the upper platform. The upper contact holder has a first side coupled to the organizer at the first side of the organizer and a second side coupled to the organizer at the second side of the organizer. The upper contact holder includes an upper locking tab. The contact assembly includes a lower contact array coupled to the central wall. The lower contact array includes lower contacts held by a lower contact holder. The lower contacts extend along the lower platform. The lower contact holder has a first side coupled to the organizer at the first side of the organizer and a second side coupled to the organizer at the second side of the organizer. The lower contact holder includes a lower locking tab. The contact assembly includes a locking device coupled to the upper locking tab and the lower locking tab to secure the upper contact holder to the lower contact holder.

In another embodiment, a card edge connector for mating with a pluggable module is provided. The card edge connector includes a housing that includes a top and a bottom. The housing has a front and a rear. The housing has a first side and a second side. The bottom configured to be mounted to a circuit board. The housing includes a cavity at the rear. The housing includes a card slot open to the cavity at the front of the housing. The card slot is configured to receive a card edge of a module circuit board of the pluggable module. The contact assembly includes a contact assembly received in the cavity. The contact assembly includes an organizer holding an upper contact array and a lower contact array and a locking device securing the upper contact array to the lower contact array. The organizer has a central wall extending between a first side and a second side of the organizer. The organizer includes an upper platform and a lower platform at a front of the organizer. The organizer includes an organizer slot between the upper platform and the lower platform aligned with the card slot and configured to receive the card edge of the module circuit card. The upper contact array is coupled to the central wall. The upper contact array includes upper contacts held by an upper contact holder. The upper contacts extend along the upper platform. The upper contact holder has a first side coupled to the organizer at the first side of the organizer and a second side coupled to the organizer at the second side of the organizer. The upper contact holder includes an upper locking tab. The lower contact array is coupled to the central wall. The lower contact array includes lower contacts held by a lower contact holder. The lower contacts extend along the lower platform. The lower contact holder has a first side coupled to the organizer at the first side of the organizer and a second side coupled to the organizer at the second side of the organizer. The lower contact holder includes a lower locking tab. The locking device is coupled to the upper locking tab and the lower locking tab to secure the upper contact holder to the lower contact holder.

In a further embodiment, a receptacle connector assembly for connecting a pluggable module with a circuit board is provided. The receptacle connector includes a receptacle cage that has walls forming a module channel configured to receive the pluggable module and a port open to the module channel. The receptable connector assembly includes a card edge connector configured to be mounted to the circuit board. The card edge connector being received in the module channel for mating with the pluggable module. The card edge connector includes a housing and a contact assembly received in the housing. The housing includes a top and a bottom. The housing has a front and a rear. The housing has a first side and a second side. The bottom configured to be mounted to a circuit board. The housing includes a cavity at the rear. The housing includes a card slot open to the cavity at the front of the housing. The card slot is configured to receive a card edge of a module circuit board of the pluggable module. The contact assembly is received in the cavity. The contact assembly includes an organizer holding an first contact array and a second contact array and a locking device securing the first contact array to the second contact array. The organizer has a central wall that extends between a first side and a second side of the organizer. The organizer includes an first platform and a second platform at a front of the organizer. The organizer includes an organizer slot between the first platform and the second platform aligned with the card slot and configured to receive the card edge of the module circuit card. The first contact array is coupled to the central wall. The first contact array includes first contacts held by an first contact holder. The first contacts extend along the first platform. The first contact holder has a first side coupled to the organizer at the first side of the organizer and a second side coupled to the organizer at the second side of the organizer. The first contact holder includes an first locking tab. The second contact array is coupled to the central wall. The second contact array includes second contacts held by a second contact holder.

The second contacts extend along the second platform. The second contact holder has a first side coupled to the organizer at the first side of the organizer and a second side coupled to the organizer at the second side of the organizer. The second contact holder includes a second locking tab. The locking device is coupled to the first locking tab and the second locking tab to secure the first contact holder to the second contact holder.

DETAILED DESCRIPTION OF THE INVENTION

Figure 1:
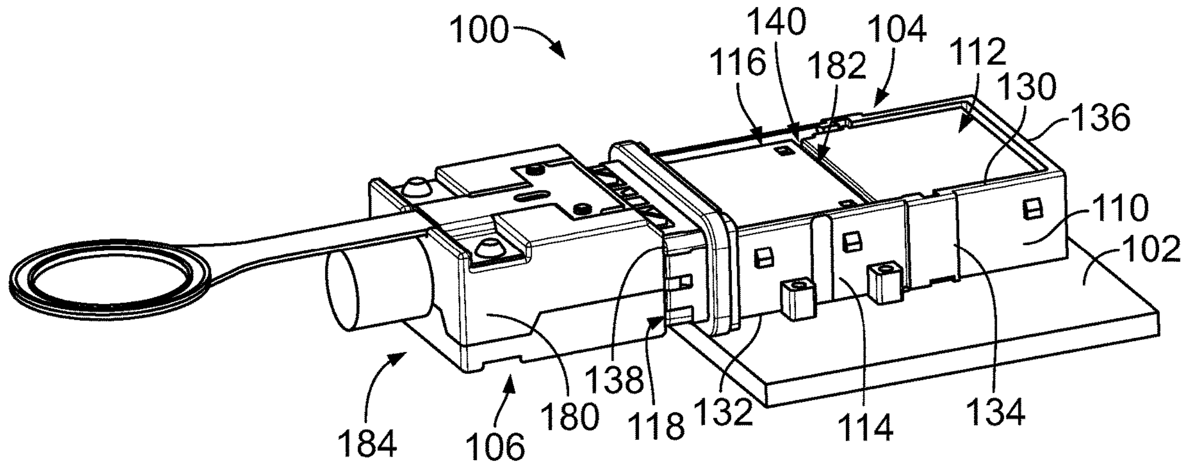
FIG. 1 is a front perspective view of a communication system in accordance with an exemplary embodiment.
Figure 2:
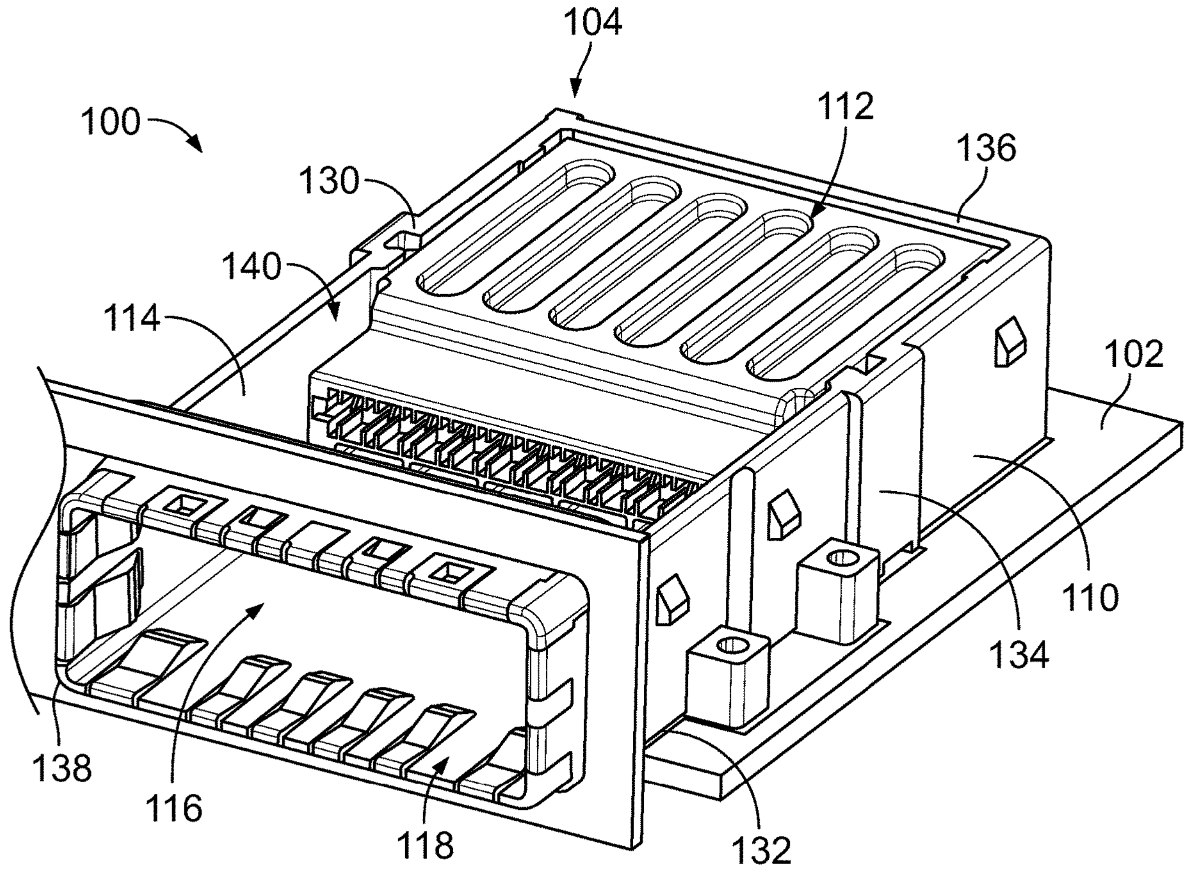
FIG. 2 is a front perspective view of a portion of the communication system in accordance with an exemplary embodiment.

FIG. 1 is a front perspective view of a communication system 100 in accordance with an exemplary embodiment. FIG. 2 is a front perspective view of a portion of the communication system 100 in accordance with an exemplary embodiment. The communication system 100 includes a circuit board 102 and a receptacle connector assembly 104 mounted to the circuit board 102. A pluggable module 106 (FIG. 1) is configured to be electrically connected to the receptacle connector assembly 104. The pluggable module 106 and the top of the receptacle connector assembly 104 are removed in FIG. 2 to illustrate components of the receptacle connector assembly 104. The pluggable module 106 is electrically connected to the circuit board 102 through the receptacle connector assembly 104.

In an exemplary embodiment, the receptacle connector assembly 104 includes a receptacle cage 110 and an electrical connector assembly 112 adjacent the receptacle cage 110. For example, in the illustrated embodiment, the electrical connector assembly 112 is received in the receptacle cage 110. In other various embodiments, the electrical connector assembly 112 may be located rearward of the receptacle cage 110. In various embodiments, the electrical connector assembly 112 is a card edge connector and may be referred to hereinafter as a card edge connector 112.

In various embodiments, the receptacle cage 110 is enclosed and provides electrical shielding for the electrical connector assembly 112. The pluggable module 106 is loaded into the receptacle cage 110 and is at least partially surrounded by the receptacle cage 110. The receptacle cage 110 includes a plurality of walls 114 that define one or more module channels for receipt of corresponding pluggable module(s) 106. The walls 114 may be walls defined by solid sheets, perforated walls to allow airflow therethrough, walls with cutouts, such as for a heatsink or heat spreader to pass therethrough, or walls defined by rails or beams with relatively large openings. In an exemplary embodiment, the receptacle cage 110 is a shielding, die cast metallic cage member with the walls 114 being shielding walls 114. In other embodiments, the receptacle cage 110 may be open between frame members, such as rails or beams, to provide cooling airflow for the pluggable module 106 with the frame members of the receptacle cage 110 defining guide tracks for guiding loading of the pluggable module 106 into the receptacle cage 110.

In the illustrated embodiment, the receptacle cage 110 is a single port cage configured to receive a single pluggable module 106 in a single module channel 116. However, in alternative embodiments, the receptacle cage 110 may include multiple ports to receive multiple pluggable modules, such as being a stacked cage member having upper and lower module channels 116. The module channels 116 may be arranged in a single column, however, the receptacle cage 110 may include multiple columns of ganged module channels in alternative embodiments (for example, 2×2, 3×2, 4×2, 4×3, etc.). The receptacle cage 110 includes a port 118 providing access to the module channel 116. The pluggable module 106 is plugged into the module channel 116 through the port 118. Optionally, multiple electrical connector assemblies 112 may be arranged within the receptacle cage 110 to mate with the multiple pluggable modules.

In an exemplary embodiment, the walls 114 of the receptacle cage 110 include a top wall 130, a bottom wall 132, and side walls 134 extending between the top wall 130 and the bottom wall 132. The bottom wall 132 may rest on the circuit board 102. However, in alternative embodiments, the bottom wall 132 may be elevated a distance above the circuit board 102 defining a gap below the bottom wall 132, such as for airflow. In other various embodiments, the receptacle cage 110 may be provided without the bottom wall 132. Optionally, the walls 114 of the receptacle cage 110 may include a rear wall 136 and a front wall 138 at the front of the receptacle cage 110. The module port 118 is provided in the front wall 138. The walls 114 define a cavity 140, which forms the module channel(s) 116. The cavity 140 is defined by the top wall 130, the bottom wall 132, the side walls 134, the rear wall 136 and the front wall 138. Other walls 114 may separate or divide the cavity 140 into various module channels 116. For example, the walls 114 may include a channel separator between upper and lower module channels 116. The walls 114 may include divider walls, parallel to the side walls 134, extending between the top wall 130 and the bottom wall 132 to separate adjacent module channels from each other.

In an exemplary embodiment, the receptacle cage 110 may include one or more gaskets at the front wall 138 for providing electrical shielding for the module channel 116. For example, the gaskets may be configured to electrically connect with the pluggable module 106 received in the module channel 116. The gaskets may be configured to electrically connect to a panel or bezel.

In an exemplary embodiment, the receptacle connector assembly 104 may include one or more heat sinks (not shown) for dissipating heat from the pluggable module 106. For example, the heat sink may be coupled to the top wall 130 and extend through an opening in the top wall 130 to engage the pluggable module 106 and dissipate heat from the pluggable module 106.

In an exemplary embodiment, the electrical connector assembly 112 is received in the cavity 140, such as proximate to the rear wall 136. However, in alternative embodiments, the electrical connector assembly 112 may be located behind the rear wall 136 exterior of the receptacle cage 110 and extend into the cavity 140 to interface with the pluggable module(s) 106. In an exemplary embodiment, a single electrical connector assembly 112 is used. However, multiple electrical connector assemblies 112 may be used in other embodiments.

In an exemplary embodiment, the pluggable module 106 is loaded through the front wall 138 to mate with the electrical connector assembly 112. The shielding walls 114 of the receptacle cage 110 provide electrical shielding around the electrical connector assembly 112 and the pluggable module 106, such as around the mating interfaces between the electrical connector assembly 112 and the pluggable module 106.

In an exemplary embodiment, the pluggable module 106 is an input/output (I/O) module, such as a transceiver module. The pluggable module 106 includes a pluggable body 180, which may be defined by one or more shells. The pluggable body 180 may be thermally conductive and/or may be electrically conductive, such as to provide EMI shielding for the pluggable module 106. The pluggable body 180 includes a mating end 182 plugged into the receptacle cage 110 and a cable end 184 opposite the mating end 182. The pluggable body 180 holds one or more module circuit boards 190 (shown in FIG. 10) that is/are configured to be communicatively coupled to the electrical connector assembly 112. The module circuit board 190 is accessible at the mating end 182 for mating with the electrical connector assembly 112. The module circuit board 190 has a card edge configured to be plugged into a card slot of the electrical connector assembly 112 and contacts, such as pads or circuits, at the card edge configured to be mated with the card edge connector 112.

In other various embodiments, the pluggable module 106 may be a circuit card or paddle card rather than an I/O module. For example, the pluggable module 106 may include the module circuit board 190 without the pluggable body 180 surrounding the module circuit board 190.

Figure 3:
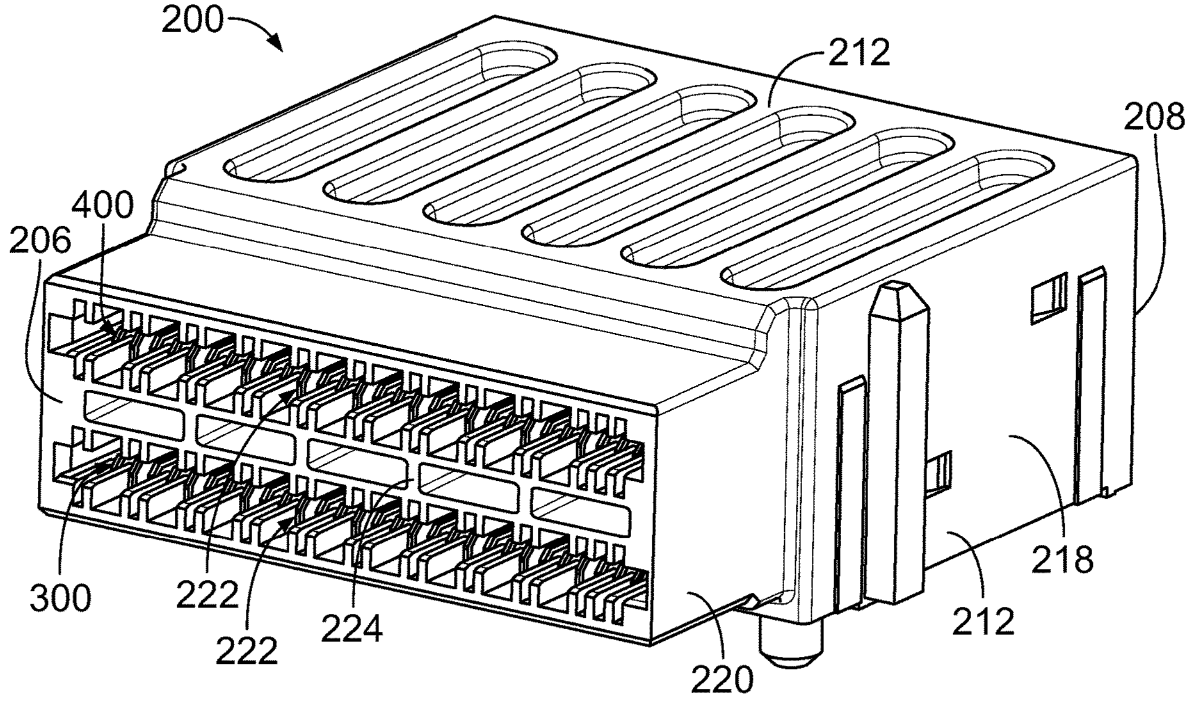
FIG. 3 is a front perspective view of the card edge connector in accordance with an exemplary embodiment.
Figure 4:
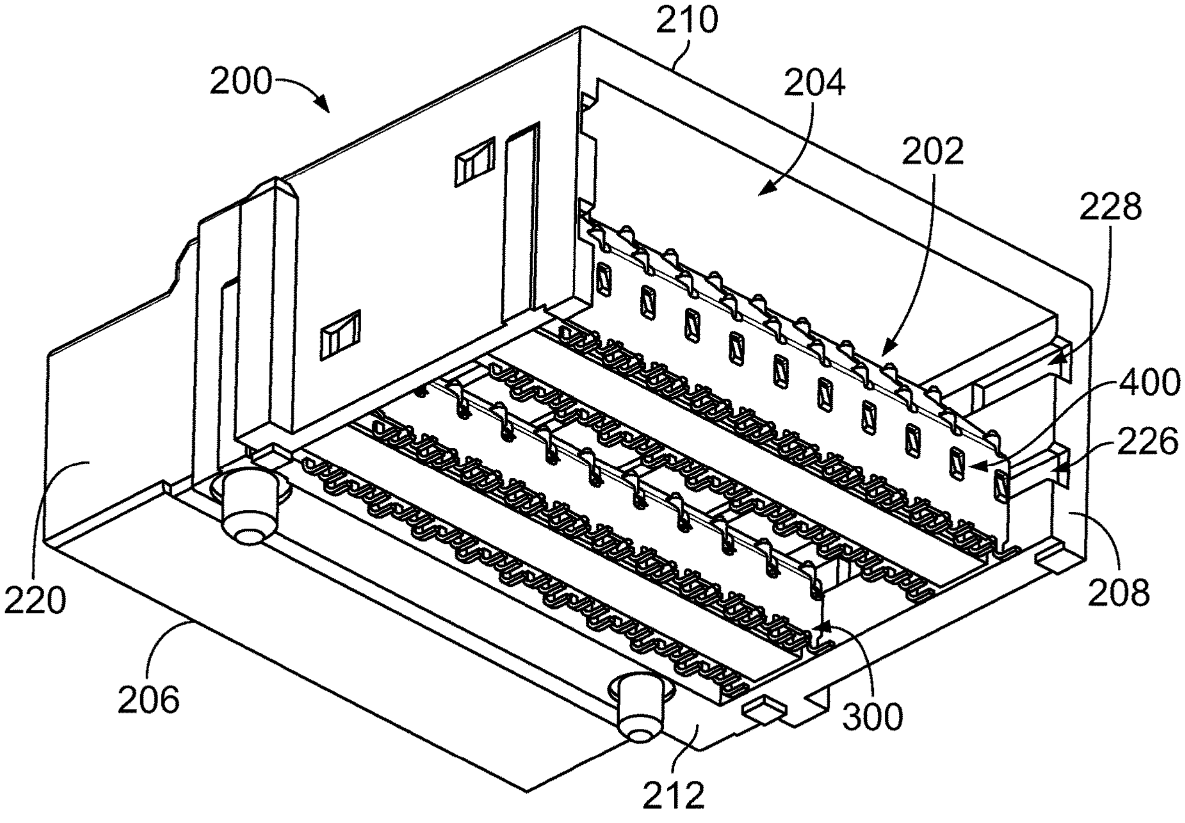
FIG. 4 is a rear perspective view of the card edge connector in accordance with an exemplary embodiment.

FIG. 3 is a front perspective view of the card edge connector 112 in accordance with an exemplary embodiment. FIG. 4 is a rear perspective view of the card edge connector 112 in accordance with an exemplary embodiment. The card edge connector 112 includes a housing 200 having a cavity 204 and a contact assembly 400 received in the cavity 204 of the housing 200.

The housing 200 extends between a front 206 and a rear 208. The cavity 204 is open at the rear 208 to receive the contact assembly 400. The housing 200 extends between a top 210 and a bottom 212. The housing 200 extends between opposite sides 218. The housing 200 may be generally box shaped in various embodiments. In the illustrated embodiment, the bottom 212 defines a mounting end configured to be mounted to the circuit board 102 (shown in FIG. 1) and the front 206 defines the mating end configured to be mated with the pluggable module 106 (shown in FIG. 1). Other orientations are possible in alternative embodiments, such as with the mating end at the top 210 and/or the mounting end at the rear 208.

The housing 200 includes a shroud 220 at the mating end, such as at the front 206. The shroud 220 is configured to be received in the pluggable module 106 (FIG. 1) when the pluggable module 106 is mated with the electrical connector assembly 112. The housing 200 includes one or more card slots 222 surrounded by the shroud 220. In the illustrated embodiment, the housing 200 includes two card slots 222, such as an upper card slot and a lower card slot. The shroud 220 includes a separating wall 224 between the card slots 222. The card slots 222 receive the card edges of the module circuit boards 190 (shown in FIG. 10) on opposite sides of the separating wall 224.

The contact assembly 400 is positioned in the housing 200 with contacts located at the corresponding card slot 222 to mate with the module circuit boards 190. For example, the card edge connector 112 may include a lower contact assembly positioned in the lower portion of the housing 200 and an upper contact assembly positioned in the upper portion of the housing 200. The lower contact assembly may be similar to the upper contact assembly and include similar components, which may be sized and shaped differently for fitting into the housing 200. The housing 200 includes guide features 226 to guide the contact assemblies 400 into the housing 200. For example, the guide features 226 may be guide slots 228 extending along the sides 218 for loading the contact assemblies 400 into the cavity 204 of the housing 200.

Figure 5:
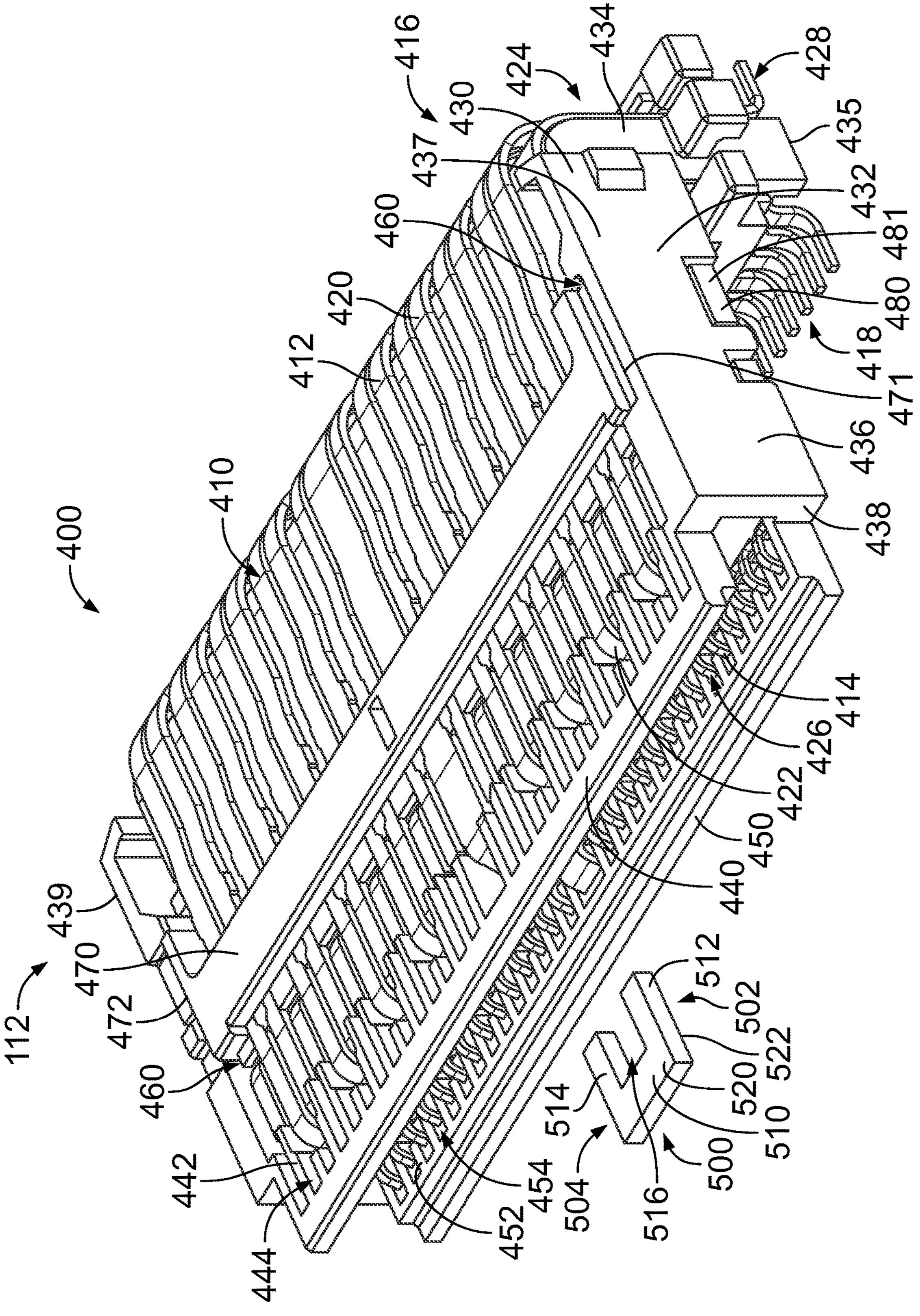
FIG. 5 is a front perspective view of the contact assembly in accordance with an exemplary embodiment.

FIG. 5 is a front perspective view of the contact assembly 400 in accordance with an exemplary embodiment. In an exemplary embodiment, the contact assembly 400 is a multi-row contact assembly. For example, the contact assembly 400 may be a double-sided contact assembly 400 having contacts arranged in an upper row and a lower row.

In an exemplary embodiment, the contact assembly 400 includes an organizer 430 holding a plurality of contacts 410 including upper contacts 412 arranged in a row along the upper portion of the contact assembly 400 and lower contacts 414 arranged in a row along the lower portion of the contact assembly 400. The upper contacts 412 are arranged in an upper contact array 416 and the lower contacts 414 are arranged in a lower contact array 418. The upper contacts 412 of the upper contact array 416 may be a stamped and formed leadframe. The lower contacts 414 of the lower contact array 418 may be a stamped and formed leadframe. The upper and lower contact arrays 416, 418 may include dielectric bodies or carriers holding the upper and lower contacts 412. 414, respectively.

Figure 10:
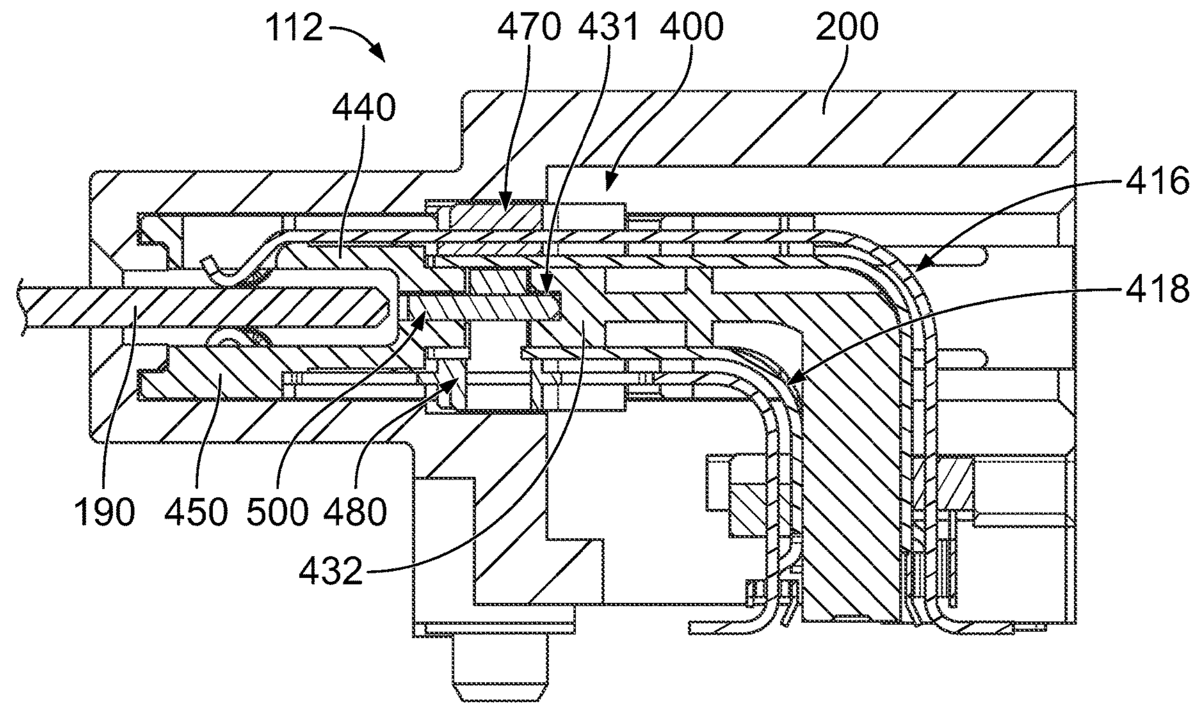
FIG. 10 is a cross-sectional view of the card edge connector in accordance with an exemplary embodiment.

The organizer 430 is used to position the upper and lower contacts 412, 414 (FIG. 6) relative to each other. The organizer 430 is used to hold the upper and lower contacts 412, 414 for loading into the housing 200 (shown in FIG. 4). The organizer 430 may be a single piece structure, such as a single mold or die-cast component, holding both the upper contacts 412 and the lower contacts 414. The organizer 430 includes an organizer slot configured to receive the card edge of the module circuit board 190 (FIG. 10). The upper and lower contacts 412, 414 are configured to be arranged on opposite sides of the organizer card slot for mating with opposite sides of the module circuit board 190. The contact assembly 400 has high density and significant data throughput.

The organizer 430 includes a central wall 432 including a rear wall 434 and a front wall 436. The rear wall 434 extends to a bottom end 435. The bottom end 435 may be configured to face the circuit board 102 (shown in FIG. 1). The rear wall 434 may extend generally vertically. Optionally, the rear wall 434 may include a transition portion that extends between the vertical portion and the front wall 436. The front wall 436 extends forward from the rear wall 434 to a front end 438 of the organizer 430. Optionally, the front wall 436 may extend generally horizontally. The front wall 436 may be oriented generally perpendicular to the rear wall 434. The central wall 432 extends between a first side 437 and a second side 439 of the organizer 430. For example, the organizer 430 may include side walls at the first and second sides 437, 439. The contact arrays 416, 418 are arranged between the side walls. The central wall 432 holds the upper and lower contact arrays 416, 418. For example, the upper contact array 416 is located above the front wall 436 and rearward of the rear wall 434. The lower contact array 418 is located below the front wall 436 and forward of the rear wall 434.

At the front end 438, the organizer 430 includes an upper platform 440 and a lower platform 450 opposite the upper platform 440. The organizer card slot is located between the upper and lower platforms 440, 450. The upper and lower platforms 440, 450 may extend forward from the central wall 432. The upper platform 440 supports the upper contacts 412. The lower platform 450 supports the lower contacts 414. The upper platform 440 includes upper separating walls 442 that define upper contact channels 444 that receive the upper contacts 412. The lower platform 450 includes lower separating walls 452 that define lower contact channels 454 that receive the lower contacts 414.

In an exemplary embodiment, the organizer 430 includes pockets 460 that receive the contact arrays. The pockets 460 may be provided in the upper portion and/or the lower portion of the central wall 432. The pockets 460 are located rearward of the platforms 440, 450. The pockets 460 may be formed in the sidewalls at the first and second sides 437, 439 of the organizer 430.

In an exemplary embodiment, the lower contact array 418 is similar to the upper contact array 416 and includes similar features, which are described below with reference to the upper contact array 416. The upper contact array 416 includes a contact leadframe forming the upper contacts 412. The upper contacts 412 may include signal contacts and/or ground contacts and/or power contacts. In an exemplary embodiment, the signal contacts of the upper contacts 412 are arranged in pairs. For example, the signal contacts may be differential pairs. The ground contacts of the upper contacts 412 may be arranged between the pairs of the signal contacts in a ground-signal-signal-ground arrangement. Other arrangements are possible in alternative embodiments.

The contact leadframe is a stamped and formed leadframe to form the upper contacts 412. The contact leadframe may be overmolded with one or more overmolded bodies to hold the relative positions of the upper contacts 412. In an exemplary embodiment, the upper contact array 416 includes a contact holder 470 holding the upper contacts 412. In various embodiments, the contact holder 470 is a dielectric body, such as an overmolded body, which is overmolded over the upper contacts 412. However, the upper contacts 412 may be stitched or otherwise loaded into the contact holder 470 in alternative embodiments. The contact holder 470 is configured to be coupled to the organizer 430 to position the upper contact array 416 relative to the organizer 430. For example, the contact holder 470 is received in the pocket 460 in the organizer 430. The contact holder 470 extends between a first side 471 and a second side 472. The contact holder 470 is coupled to the organizer 430 at the first and second sides 471, 472.

Each contact 412 includes an intermediate portion 420 extending between a mating end 422 and a terminating end 424. The intermediate portion 420 is held by the upper contact holder 470. For example, the upper contact holder 470 encapsulates sections of the intermediate portions 420. The mating end 422 is located forward of the upper contact holder 470. The terminating end 424 is located rearward of the upper contact holder 470. The mating end 422 is configured to be mated to the module circuit board 190 (FIG. 10). In an exemplary embodiment, the contact 412 includes a mating beam 426 at the mating end 422. The mating beam 426 is a deflectable spring beam. However, other types of mating portions may be provided at the mating end, such as pins, contacts, blades, tuning fork contacts, and the like. The terminating end 424 is configured to be terminated to the circuit board 102 (FIG. 1). In an exemplary embodiment, the contact 412 includes a solder tail 428 at the terminating end 424. The solder tail 428 is configured to be soldered to a board pad of the circuit board 102. In the illustrated embodiment, the solder tails 428 include 90° bends to orient the solder tails 428 parallel to the circuit board 102 for connection to the circuit board 102. Other types of terminating portions may be used in alternative embodiments, such as compliant pins, solder pins, spring beams, and the like.

The lower contact array 418 is similar to the upper contact array 416. The lower contact array 418 includes a leadframe forming the lower contacts 414 and a lower contact holder 480, which is similar to the upper contact holder 470. The lower contact holder 480 is a dielectric body, such as an overmolded body, which is overmolded over the lower contacts 414. The lower contact holder 480 is configured to be coupled to the organizer 430 to position the lower contact array 418 relative to the organizer 430. For example, the contact holder 480 is received in the pocket 460 in the organizer 430. The contact holder 470 is coupled to the organizer 430 at first and second sides 481, 482. Each contact 414 within the lower contact array 418 includes an intermediate portion 420 extending between a mating end 422 and a terminating end 424.

In an exemplary embodiment, the contact assembly 400 includes a locking device 500 used for securing the upper contact array 416 and the lower contact array 418 together. The locking device 500 is used to prevent separation of the upper contact array 416 relative to the lower contact array 418, such as during mating with the module circuit board 190. For example, the locking device 500 is used to physically tie the upper and lower contact holders 470, 480 together to prevent separation of the upper and lower contact holders 470, 480. The locking device 500 operates as an anti-rotation feature to prevent rotation of the upper contact holder 470 and/or rotation of the lower contact holder 480 within the organizer 430. In an exemplary embodiment, the locking device 500 is located near a central region of the contact holders 470, 480 to prevent separation at such central region, which are the regions of least support. For example, because the contact holders 470, 480 are coupled to the organizer 430 at the sides of the contact holders 470, 480, the central regions of the contact holders 470, 480 may tend to separate and rotate apart from each other when mated to the module circuit board 190. The locking device 500 locks the contact holders 470, 480 together to stabilize the upper and lower contact arrays 416, 418 relative to the organizer 430 within the housing 200 of the card edge connector 112. Optionally, multiple locking devices 500 may be used spaced apart along the width of the contact arrays 416, 418.

The locking device 500 may be a molded piece, such as a plastic molded piece. The locking device 500 includes a first locking element 502 for locking to the upper contact holder 470 and a second locking element 504 for locking to the lower contact holder 480. In an exemplary embodiment, the locking device 500 is a clip configured to be clipped to the upper and lower contact holders 470, 480. In various embodiments, the locking device 500 is C-shaped.

In an exemplary embodiment, the locking device 500 includes a base wall 510, a first leg 512 extending from a first side of the base wall 510, and a second leg 514 extending from a second side of the base wall 510. The locking device 500 includes a space 516 between the first leg 512 and the second leg 514. The space is configured to receive portions of the upper and lower contact holders 470, 480. In an exemplary embodiment, the locking device 500 includes an upper surface 520 and a lower surface 522. The upper and lower surfaces 520, 522 may be planar. In other various embodiments, the locking device 500 may be stepped, such as vertically stepped to include an upper portion and a lower portion. The locking device 500 may include latching features, such as a deflectable latch or a catch or other features to latchably couple to the contact holders 470, 480.

Figure 6:
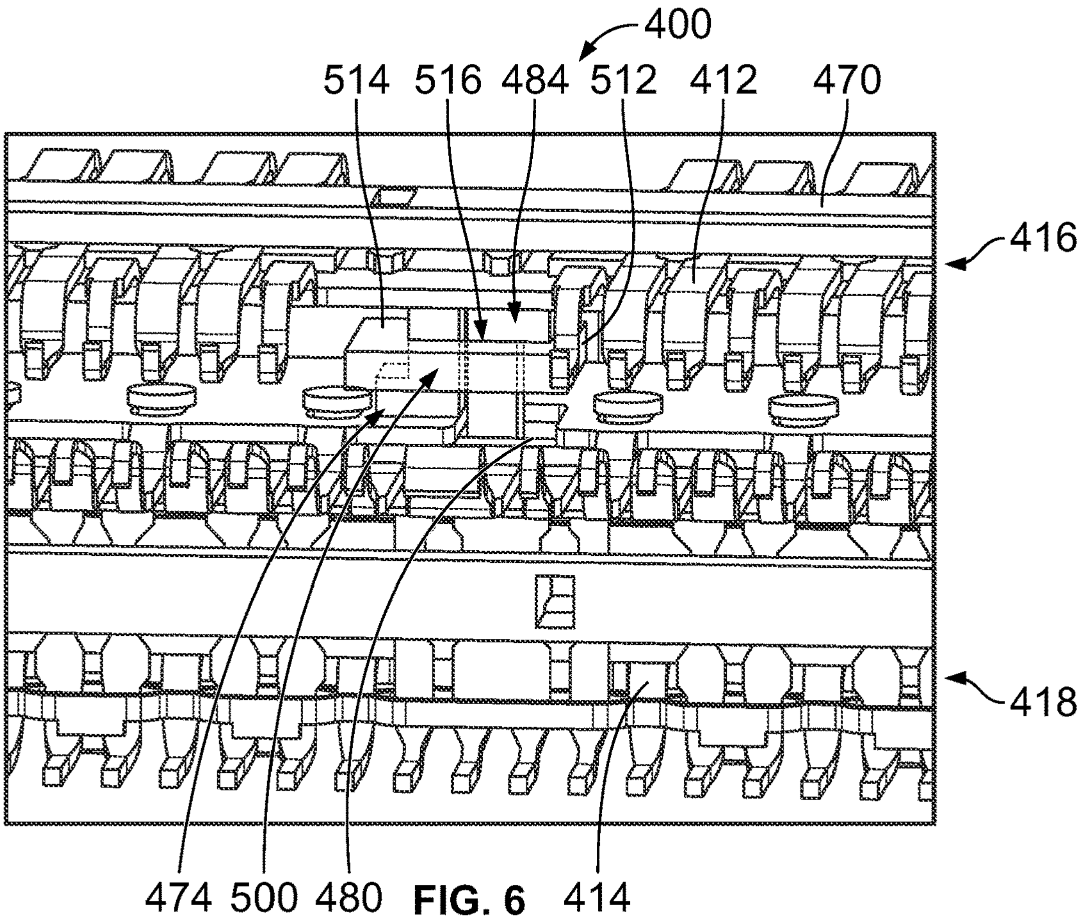
FIG. 6 is a front perspective view of a portion of the contact assembly in accordance with an exemplary embodiment.
Figure 7:
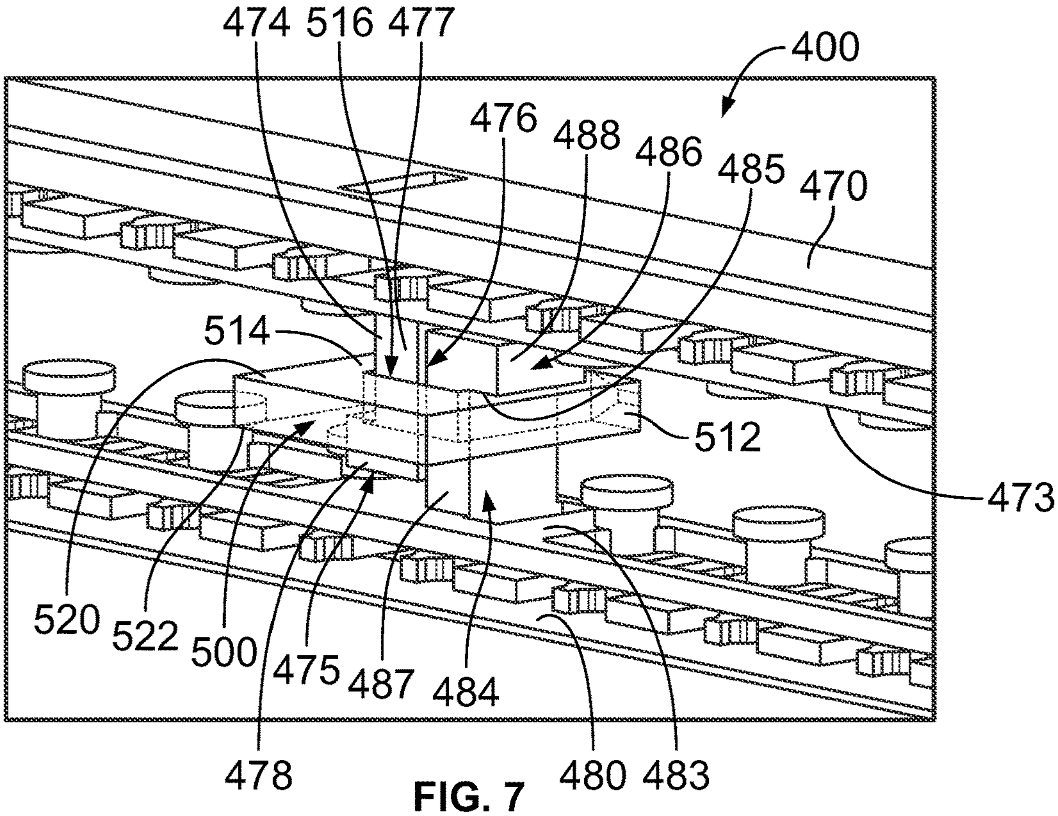
FIG. 7 is a front perspective view of a portion of the contact assembly in accordance with an exemplary embodiment.

FIG. 6 is a front perspective view of a portion of the contact assembly 400 in accordance with an exemplary embodiment. FIG. 7 is a front perspective view of a portion of the contact assembly 400 in accordance with an exemplary embodiment. FIGS. 6 and 7 illustrate the locking device 500 coupled to the upper and lower contact arrays 416, 418. FIG. 7 shows the upper and lower contact holders 470, 480 with the contacts 412, 414 (shown in FIG. 6) and shields removed to illustrate the contact holders 470, 480.

In an exemplary embodiment, the upper contact holder 470 includes an upper locking tab 474 extending from an inner surface 473 of the upper contact holder 470. In the illustrated embodiment, the inner surface 473 is a bottom surface of the upper contact holder 470. The upper locking tab 474 extends downward from the inner surface 473. The locking device 500 is configured to be coupled to the upper locking tab 474. In an exemplary embodiment, the upper locking tab 474 includes a locking feature 475 configured to be lockably coupled to the locking device 500. In an exemplary embodiment, the upper locking tab 474 includes a hook 476 forming the locking feature 475. For example, the upper locking tab 474 includes a locking arm 477 and a locking finger 478 extending from the locking arm 477. The locking finger 478 forms the locking feature 475. In the illustrated embodiment, the locking arm 477 extends from the inner surface 473. For example, the locking arm 477 extends downward from the inner surface 473. The locking finger 478 extends from the distal end of the locking arm 477. In an exemplary embodiment, the locking finger 478 extends perpendicular to the locking arm 477. For example, the upper locking tab 474 is L-shaped in the illustrated embodiment. The upper locking tab 474 is configured to wrap around the locking device 500 to secure the upper locking tab 474 to the locking device 500. The upper locking tab 474 may have other shapes in alternative embodiments. The upper locking tab 474 may be secured to the locking device 500 by other means in alternative embodiments.

In an exemplary embodiment, the lower contact holder 480 includes a lower locking tab 484 extending from an inner surface 483 of the lower contact holder 480. In the illustrated embodiment, the inner surface 483 is a top surface of the lower contact holder 480. The lower locking tab 484 extends upward from the inner surface 483. The locking device 500 is configured to be coupled to the lower locking tab 484. In an exemplary embodiment, the lower locking tab 484 includes a locking feature 485 configured to be lockably coupled to the locking device 500. In an exemplary embodiment, the lower locking tab 484 includes a hook 486 forming the locking feature 485. For example, the lower locking tab 484 includes a locking arm 487 and a locking finger 488 extending from the locking arm 487. The locking finger 488 forms the locking feature 485. In the illustrated embodiment, the locking arm 487 extends from the inner surface 483. For example, the locking arm 487 extends downward from the inner surface 483. The locking finger 488 extends from the distal end of the locking arm 487. In an exemplary embodiment, the locking finger 488 extends perpendicular to the locking arm 487. For example, the lower locking tab 484 is L-shaped in the illustrated embodiment. The lower locking tab 484 is configured to wrap around the locking device 500 to secure the lower locking tab 484 to the locking device 500. The lower locking tab 484 may have other shapes in alternative embodiments. The lower locking tab 484 may be secured to the locking device 500 by other means in alternative embodiments.

In an exemplary embodiment, the contact arrays 416, 418 are stacked such that the upper locking tab 474 and the lower locking tab 484 are located adjacent each other. The locking device 500 is configured to engage both locking tabs 474, 484 to secure the upper contact holder 470 relative to the lower contact holder 480. The locking device 500 prevents separation and/or rotation of either of the contact holders 470, 480. In an exemplary embodiment, the locking tabs 474, 484 are received in the space 516 between the first and second legs 512, 514. For example, the locking tabs 474, 484 overlap each other. The locking tabs 474, 484 may engage each other. For example, the locking arms 477, 487 may extend along and abut against each other. The upper locking tab 474 passes through the locking device 500 to engage the lower surface 522 of the locking device 500. The upper locking tab 474 engages the lower surface 522 of the locking device 500 to lock the upper locking tab 474 to the locking device 500 and prevent upward movement of the upper locking tab 474, and thus the upper contact holder 470, relative to the locking device 500. The lower locking tab 484 passes through the locking device 500 to engage the upper surface 520 of the locking device 500. The lower locking tab 484 engages the upper surface 520 of the locking device 500 to lock the lower locking tab 484 to the locking device 500 and prevent downward movement of the lower locking tab 484, and thus the lower contact holder 480, relative to the locking device 500. The locking device 500 directly engages both of the locking tabs 474, 484 to physically connect the upper and lower contact holders 470, 480. For example, the locking device 500 may be clipped onto the locking tabs 474, 484 to physically connect the upper contact holder 470 and the lower contact holder 480. The locking tabs 474, 484 are captured between the legs 512, 514 of the locking device 500. Optionally, the legs 512, 514 may be wedge shaped to wedge the locking tabs 474, 484 into the space 516 between the legs 512, 514. The locking tabs 474, 484 may be wedged side-to-side (for example, horizontally) and/or may be wedged vertically to tightly hold the locking tabs 474, 484 relative to each other.

Figure 8:
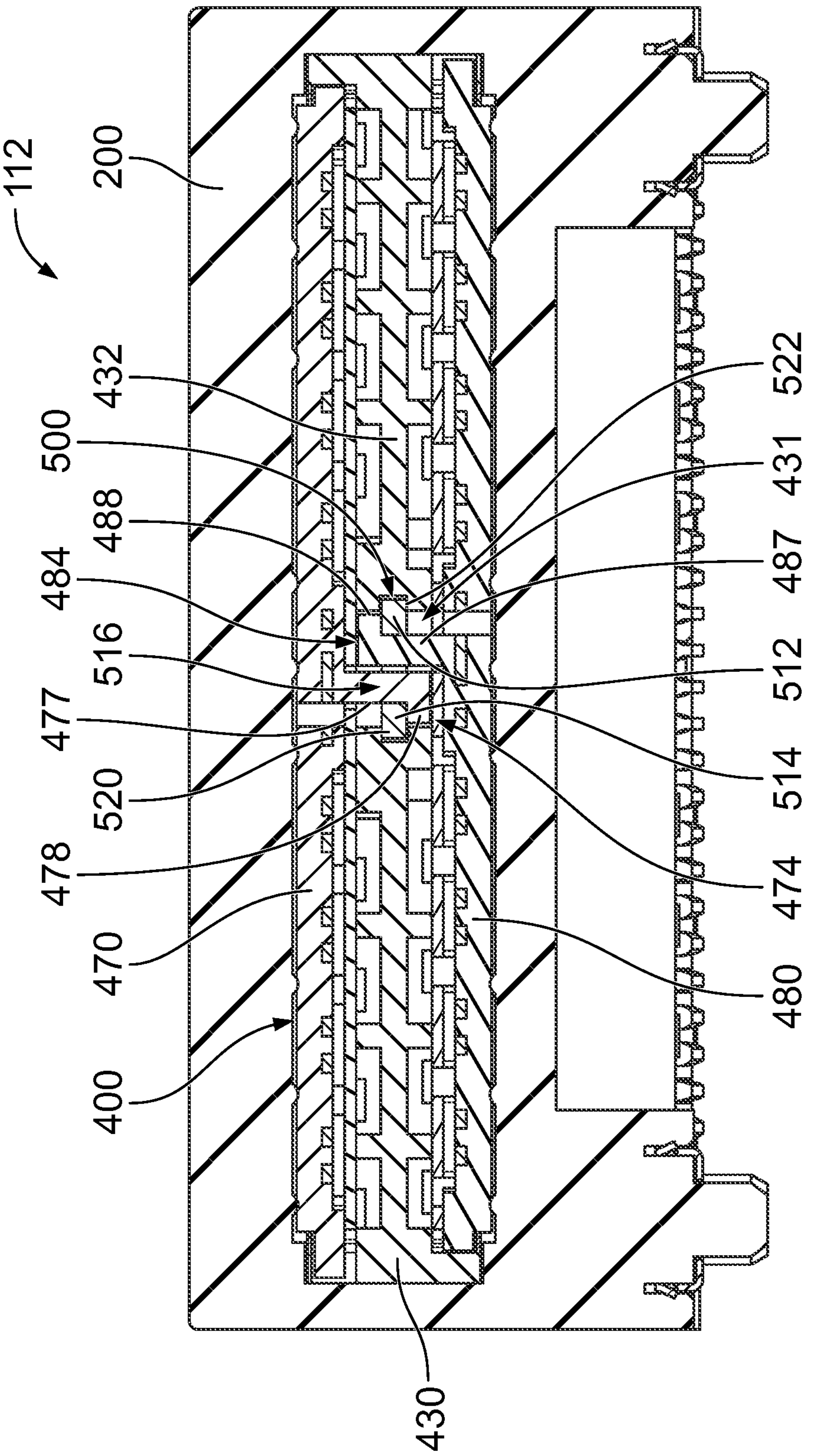
FIG. 8 is a cross-sectional view of the card edge connector in accordance with an exemplary embodiment.
Figure 9:
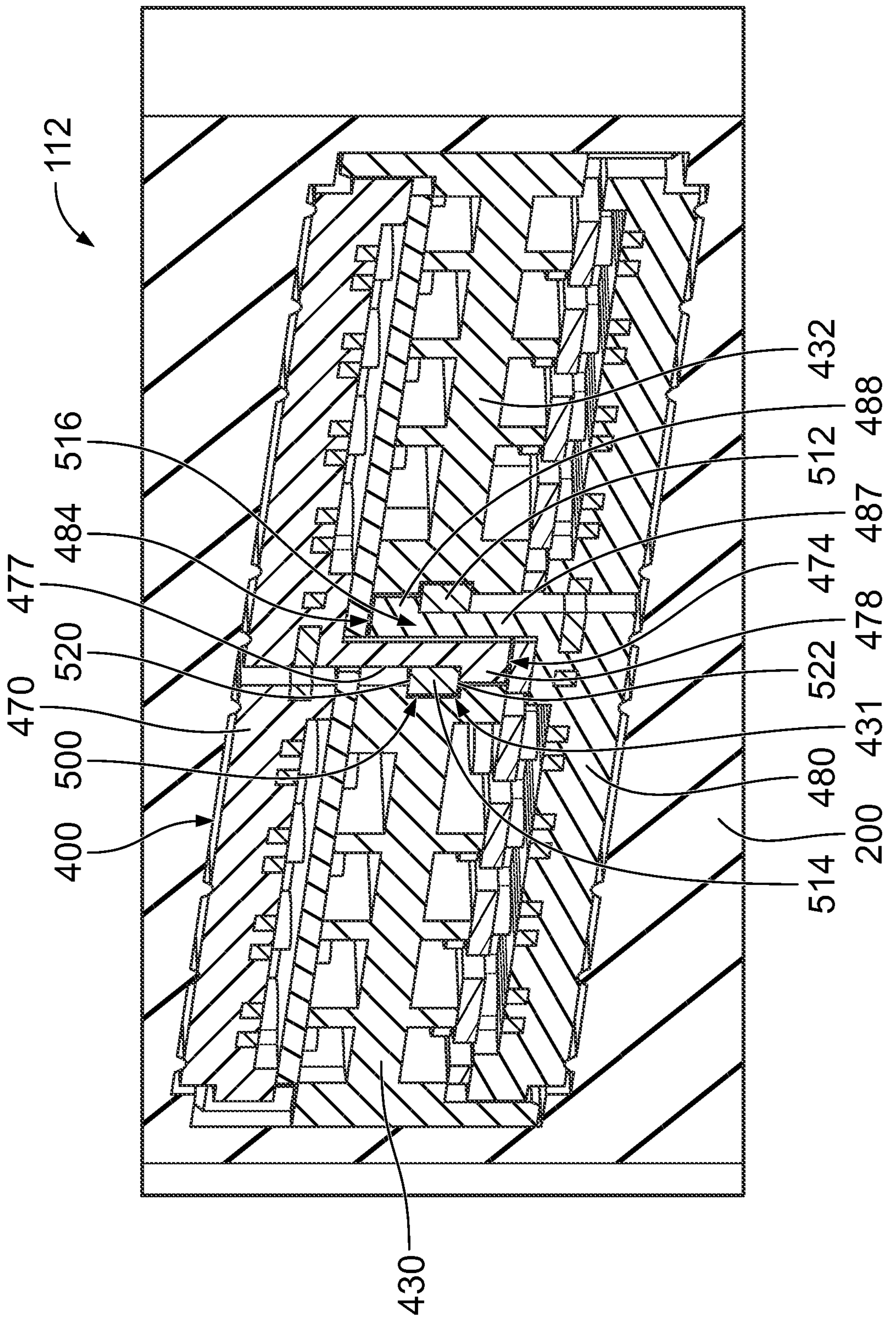
FIG. 9 is a sectional view of a portion of the card edge connector in accordance with an exemplary embodiment.

FIG. 8 is a cross-sectional view of the card edge connector 112 in accordance with an exemplary embodiment. FIG. 9 is a sectional view of a portion of the card edge connector 112 in accordance with an exemplary embodiment. FIGS. 8 and 9 illustrate the contact assembly 400 in the housing 200. FIGS. 8 and 9 illustrate the locking device 500 locking the upper contact holder 470 and the lower contact holder 480 together to prevent separation of the upper and lower contact holders 470, 480.

In an exemplary embodiment, the central wall 432 includes a pocket 431. The upper and lower locking tabs 474, 484 are received in the pocket 431. For example, the upper locking tab 474 is loaded into the pocket 431 from above, whereas the lower locking tab 484 is loaded into the pocket 431 from below. The locking device 500 is received in the pocket 431 to interface with the upper and lower locking tabs 474, 484. The pocket 431 is shaped to receive the locking device 500. Optionally, the pocket 431 may vertically and/or horizontally position the locking device 500 to ensure positioning of the locking device 500 relative to the upper and lower locking tabs 474, 484. The locking device 500 may be loaded into the pocket 431 from the front of the organizer 430. The legs 512, 514 are located on opposite sides of the locking arms 477, 487. For example, the locking arms 477, 487 are located in the space 516 between the legs 512, 514. The locking device 500 engages the locking fingers 478, 488. For example, the locking finger 478 of the upper locking tab 474 wraps around and engages the lower surface 522 of the locking device 500 to lock the upper locking tab 474 to the locking device 500 and prevent upward movement of the upper locking tab 474 relative to the locking device 500. Similarly, the locking finger 488 of the lower locking tab 484 wraps around and engages the upper surface 520 of the locking device 500 to lock the lower locking tab 484 to the locking device 500 and prevent downward movement of the lower locking tab 484 relative to the locking device 500. As such, the upper contact holder 470 is unable to separate from the lower contact holder 480, and vice versa.

Figure 11:
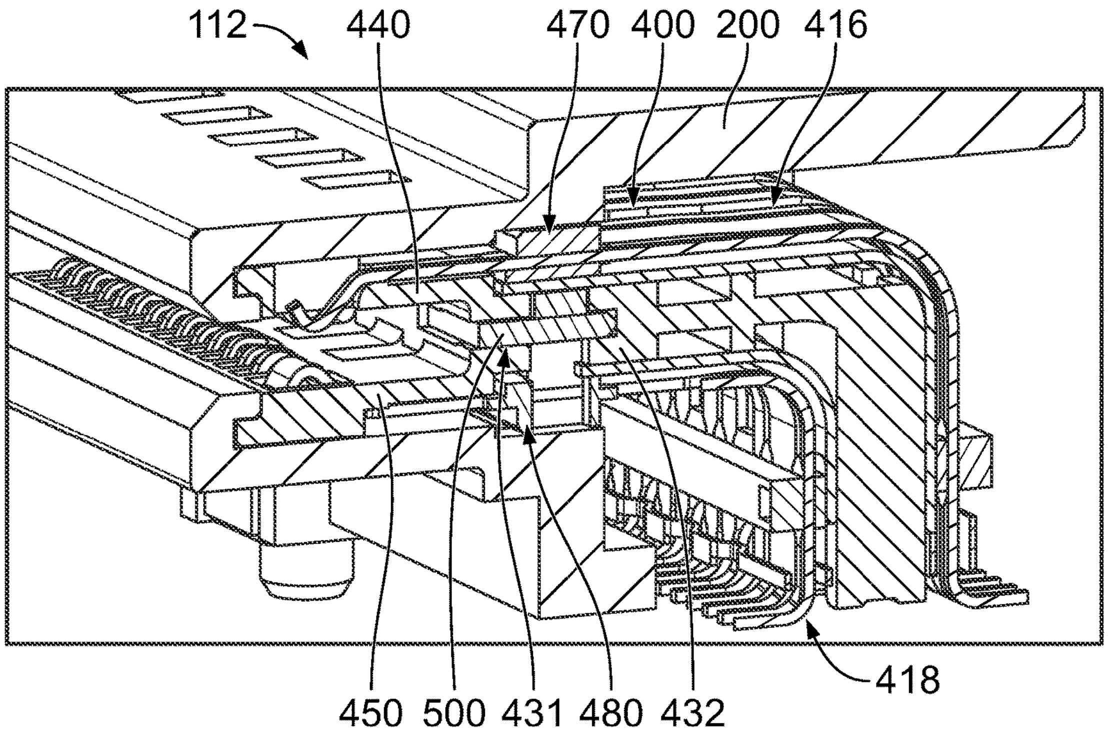
FIG. 11 is a sectional view of a portion of the card edge connector in accordance with an exemplary embodiment.

FIG. 10 is a cross-sectional view of the card edge connector 112 in accordance with an exemplary embodiment. FIG. 11 is a sectional view of a portion of the card edge connector 112 in accordance with an exemplary embodiment. FIGS. 10 and 11 illustrate the contact assembly 400 in the housing 200. FIGS. 10 and 11 illustrate the locking device 500 locking the upper contact holder 470 and the lower contact holder 480 together to prevent separation of the upper and lower contact holders 470, 480.

The locking device 500 is shown loaded in the pocket 431 of the central wall 432. The pocket 431 may be open at the front of the central wall 432 for loading the locking device 500 into the pocket 431 through the card slot. For example, the locking device 500 may be loaded into the pocket 431 in the space between the upper and lower platforms 440, 450. The module circuit board 190 is configured to be loaded into the card slot between the upper and lower platforms 440, 450. Optionally, the module circuit board 190 may block removal of the locking device 500 from the pocket 431 when assembled. The locking device 500 prevents separation or rotation of the upper contact array 416 and/or the lower contact array 418 during mating with the module circuit board 190. For example, the upper and lower contact holders 470, 480 are physically tied together by the locking device to prevent movement of the upper and lower contact holders 470, 480 relative to each other and/or relative to the housing 200.

Figure 12:
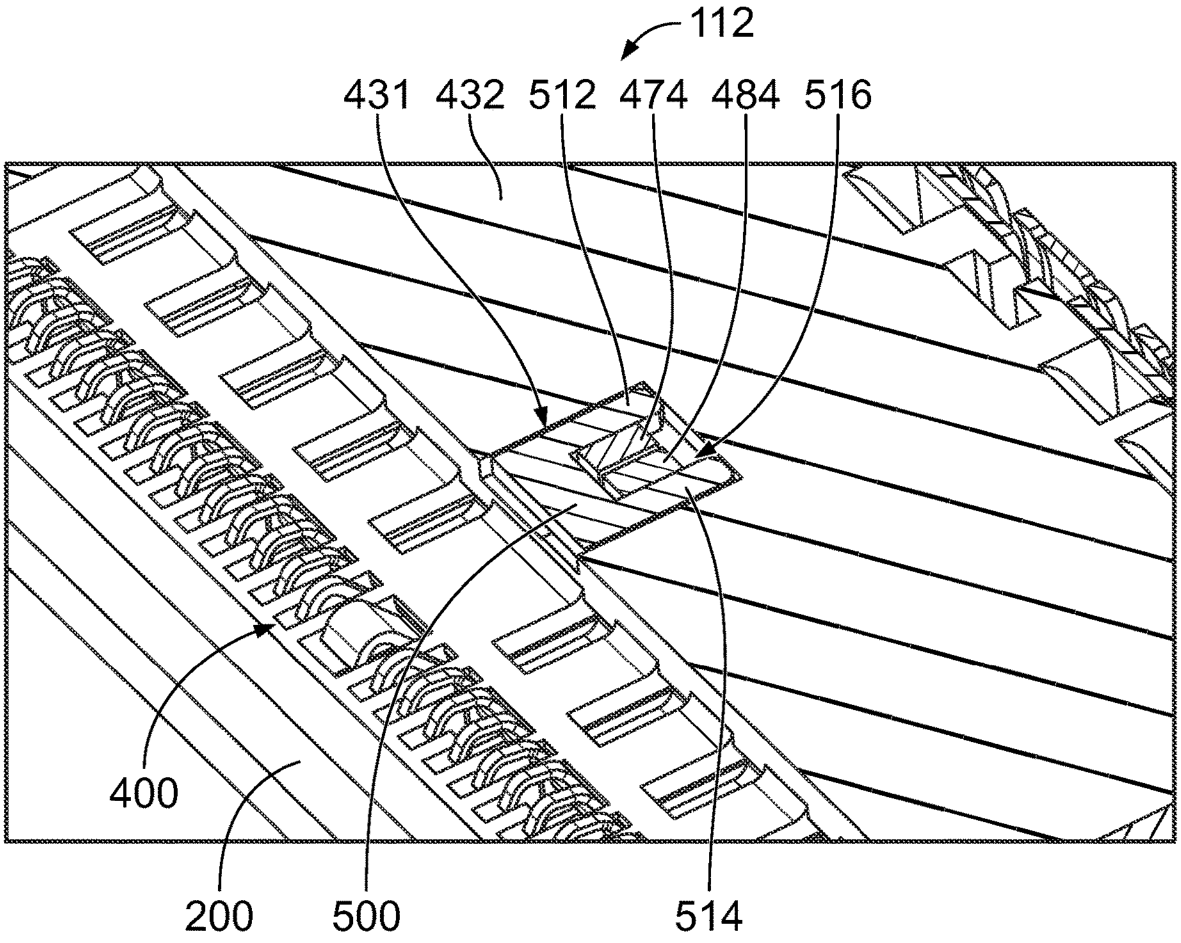
FIG. 12 is a cross-sectional view of the card edge connector in accordance with an exemplary embodiment.

FIG. 12 is a cross-sectional view of the card edge connector 112 in accordance with an exemplary embodiment. FIG. 12 illustrates the contact assembly 400 in the housing 200. FIG. 12 illustrates the locking device 500 locking the upper contact holder 470 and the lower contact holder 480 together to prevent separation of the upper and lower contact holders 470, 480. The locking device 500 is shown in the pocket 431 of the central wall 432. The locking tabs 474, 484 are shown in the space 516 between the first and second legs 512, 514 of the locking device 500.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A contact assembly comprising:

an organizer having a central wall extending between a first side and a second side of the organizer, the organizer including an upper platform and a lower platform at a front of the organizer, the organizer including an organizer slot between the upper platform and the lower platform configured to receive a card edge of a circuit card;

an upper contact array coupled to the central wall, the upper contact array including upper contacts held by an upper contact holder, the upper contacts extending along the upper platform, the upper contact holder having a first side coupled to the organizer at the first side of the organizer and a second side coupled to the organizer at the second side of the organizer, the upper contact holder including an upper locking tab;

a lower contact array coupled to the central wall, the lower contact array including lower contacts held by a lower contact holder, the lower contacts extending along the lower platform, the lower contact holder having a first side coupled to the organizer at the first side of the organizer and a second side coupled to the organizer at the second side of the organizer, the lower contact holder including a lower locking tab; and a locking device coupled to the upper locking tab and the lower locking tab to secure the upper contact holder to the lower contact holder.

2. The contact assembly of claim 1, wherein the central wall includes a pocket, the upper locking tab received in the pocket, the lower locking tab received in the pocket, the locking device received in the pocket to engage the upper and lower locking tabs.

3. The contact assembly of claim 1, wherein the upper locking tab and the lower locking tab overlap each other in the central wall.

4. The contact assembly of claim 1, wherein the locking device directly engages the upper locking tab and directly engages the lower locking tab to physically connect the upper locking tab and the lower locking tab.

5. The contact assembly of claim 1, wherein the locking device includes a clip clipped to the upper locking tab and the lower locking tab.

6. The contact assembly of claim 1, wherein the locking device is C-shaped.

7. The contact assembly of claim 1, wherein the locking device prevents rotation of the upper contact assembly relative to the organizer and prevents rotation of the lower contact assembly relative to the organizer.

8. The contact assembly of claim 1, wherein the locking device is centraled between the first and second sides of the organizer.

9. The contact assembly of claim 1, wherein the locking device is located between the upper platform and the lower platform.

10. The contact assembly of claim 1, wherein the upper locking tab extends from the upper contact holder toward the lower contact holder and the lower locking tab extends from the lower contact holder toward the upper contact holder.

11. The contact assembly of claim 1, wherein the upper contact holder includes upper stabilizer tabs at first and second sides of the upper contact holder, the upper stabilizer tabs preventing rotation of the upper contact holder relative to the organizer to stabilize the upper contact assembly relative to the organizer, the lower contact holder including lower stabilizer tabs at first and second sides of the lower contact holder, the lower stabilizer tabs preventing rotation of the lower contact holder relative to the organizer to stabilize the lower contact assembly relative to the organizer.

12. The contact assembly of claim 1, wherein the locking device includes a base wall, a first leg extending from a first side of the base wall, and a second leg extending from a second side of the base wall, the locking device having a space between the first leg and the second leg, the upper and lower locking tabs being received in the space.

13. The contact assembly of claim 12, wherein the upper locking tab includes a first hook coupled to the first leg and the lower locking tab includes a second hook coupled to the second leg.

14. The contact assembly of claim 12, wherein the base wall engages both the upper locking tab and the lower locking tab.

15. The contact assembly of claim 1, wherein the locking device includes an upper surface and a lower surface, the upper locking tab engaging the lower surface of the locking device to lock the upper locking tab to the locking device and prevent upward movement of the upper locking tab relative to the locking device, the lower locking tab engaging the upper surface of the locking device to lock the lower locking tab to the locking device and prevent downward movement of the lower locking tab relative to the locking device.

16. The contact assembly of claim 15, wherein the upper locking tab includes a first hook extending along the locking device to engage the lower surface of the locking device, the lower locking tab including a second hook extending along the locking device to engage the upper surface of the locking device.

17. A card edge connector for mating with a pluggable module, the card edge connector comprising:

a housing including a top and a bottom, the housing having a front and a rear, the housing having a first side and a second side, the bottom configured to be mounted to a circuit board, the housing including a cavity at the rear, the housing including a card slot open to the cavity at the front of the housing, the card slot configured to receive a card edge of a module circuit board of the pluggable module;

a contact assembly received in the cavity, the contact assembly including an organizer holding an upper contact array and a lower contact array and a locking device securing the upper contact array to the lower contact array;

the organizer having a central wall extending between a first side and a second side of the organizer, the organizer including an upper platform and a lower platform at a front of the organizer, the organizer including an organizer slot between the upper platform and the lower platform aligned with the card slot and configured to receive the card edge of the module circuit card;

the upper contact array coupled to the central wall, the upper contact array including upper contacts held by an upper contact holder, the upper contacts extending along the upper platform, the upper contact holder having a first side coupled to the organizer at the first side of the organizer and a second side coupled to the organizer at the second side of the organizer, the upper contact holder including an upper locking tab;

the lower contact array coupled to the central wall, the lower contact array including lower contacts held by a lower contact holder, the lower contacts extending along the lower platform, the lower contact holder having a first side coupled to the organizer at the first side of the organizer and a second side coupled to the organizer at the second side of the organizer, the lower contact holder including a lower locking tab; and the locking device coupled to the upper locking tab and the lower locking tab to secure the upper contact holder to the lower contact holder.

18. The card edge connector of claim 17, wherein the upper contact holder includes upper stabilizer tabs at first and second sides of the upper contact holder, the upper stabilizer tabs engaging the housing to prevent rotation of the upper contact holder relative to the organizer in the cavity to stabilize the upper contact assembly relative to the organizer, the lower contact holder including lower stabilizer tabs at first and second sides of the lower contact holder, the lower stabilizer tabs engaging the housing to prevent rotation of the lower contact holder relative to the organizer in the cavity to stabilize the lower contact assembly relative to the organizer.

19. The card edge connector of claim 17, wherein the central wall includes a pocket, the upper locking tab received in the pocket, the lower locking tab received in the pocket, the locking device received in the pocket to engage the upper and lower locking tabs.

20. A receptacle connector assembly for connecting a pluggable module with a circuit board, the receptacle connector comprising:

a receptacle cage having walls forming a module channel configured to receive the pluggable module and a port open to the module channel;

a card edge connector configured to be mounted to the circuit board, the card edge connector being received in the module channel for mating with the pluggable module, the card edge connector including a housing and a contact assembly received in the housing:

the housing including a top and a bottom, the housing having a front and a rear, the housing having a first side and a second side, the bottom configured to be mounted to a circuit board, the housing including a cavity at the rear, the housing including a card slot open to the cavity at the front of the housing, the card slot configured to receive a card edge of a module circuit board of the pluggable module;

the contact assembly received in the cavity, the contact assembly including an organizer holding an first contact array and a second contact array and a locking device securing the first contact array to the second contact array;

the organizer having a central wall extending between a first side and a second side of the organizer, the organizer including an first platform and a second platform at a front of the organizer, the organizer including an organizer slot between the first platform and the second platform aligned with the card slot and configured to receive the card edge of the module circuit card;

the first contact array coupled to the central wall, the first contact array including first contacts held by an first contact holder, the first contacts extending along the first platform, the first contact holder having a first side coupled to the organizer at the first side of the organizer and a second side coupled to the organizer at the second side of the organizer, the first contact holder including an first locking tab;

the second contact array coupled to the central wall, the second contact array including second contacts held by a second contact holder, the second contacts extending along the second platform, the second contact holder having a first side coupled to the organizer at the first side of the organizer and a second side coupled to the organizer at the second side of the organizer, the second contact holder including a second locking tab; and the locking device coupled to the first locking tab and the second locking tab to secure the first contact holder to the second contact holder.

* * * * *